United States Patent [19]
Dinsel et al.

[11] Patent Number: 5,208,668
[45] Date of Patent: May 4, 1993

[54] TELEVISION TRANSMISSION SYSTEM INCLUDING ENCODER AND DECODER COMPATIBLE WITH CURRENT TELEVISION STANDARDS HAVING A 4:3 ASPECT RATIO

[75] Inventors: Siegfried Dinsel; Werner Habermann, both of München, Fed. Rep. of Germany

[73] Assignee: Telefunken, Fed. Rep. of Germany

[21] Appl. No.: 720,493

[22] PCT Filed: Dec. 7, 1989

[86] PCT No.: PCT/EP89/01503
§ 371 Date: Jul. 24, 1991
§ 102(e) Date: Jul. 24, 1991

[87] PCT Pub. No.: WO90/06655
PCT Pub. Date: Jun. 14, 1990

[30] Foreign Application Priority Data
Dec. 7, 1988 [DE] Fed. Rep. of Germany ....... 3841173

[51] Int. Cl.[5] .................. H04N 7/01; H04N 7/04; H04N 11/20
[52] U.S. Cl. .................. 358/140; 358/141; 358/11
[58] Field of Search ............... 358/140, 141, 142, 11, 358/12

[56] References Cited

U.S. PATENT DOCUMENTS

| | | | |
|---|---|---|---|
| 4,651,208 | 3/1987 | Rhodes et al. | 358/140 |
| 4,693,338 | 9/1987 | Tsinberg | 358/140 |
| 4,953,025 | 8/1990 | Saitoh et al. | 358/140 |
| 5,075,773 | 12/1991 | Pullen et al. | 358/141 |
| 5,079,632 | 1/1992 | Kawai et al. | 358/141 |
| 5,084,765 | 1/1992 | Morita et al. | 358/141 |

FOREIGN PATENT DOCUMENTS 0130692 1/1985 European Pat. Off.

OTHER PUBLICATIONS

Schmidt et al., Transmission of Two NTSC Color Television Signals Over a Single Satellite Transponder Via Time-Frequency Multiplexing, IEEE Transactions on Communications, Nov. 1983, pp. 1257–1266.

Weckenbrock et al., ACTV: Advanced Compatible Television, Fernseh und Kino-Technik, vol. 42, Jul. 1988, pp. 305–311, and translation filed Jul. 24, 1992.

Primary Examiner—John K. Peng
Attorney, Agent, or Firm—Joseph S. Tripoli; Eric P. Herrmann; Ronald H. Kurdyla

[57] ABSTRACT

A television transmission system compatible with current television standard includes a compatible wide aspect ratio television signal containing vacated spatial areas along upper and lower edges of an image defined by lines remaining after lines are separated from groups of successive lines within an image scanning interval. The separated lines are inserted into the vacated spatial areas. A first carrier is modulated with non-active portions of the separated lines, and with the remaining lines. A second carrier is modulated with time expanded active image portions of the separated lines, and is disposed in an upper portion of the television signal frequency spectrum so as to be suppressed in a standard aspect ratio receiver.

8 Claims, 3 Drawing Sheets

TELEVISION TRANSMISSION SYSTEM INCLUDING ENCODER AND DECODER COMPATIBLE WITH CURRENT TELEVISION STANDARDS HAVING A 4:3 ASPECT RATIO

FIELD OF THE INVENTION

This invention concerns a television transmission system compatible with current television standards having a 4:3 aspect ratio, including an encoder and a decoder. Such a transmission system is described, for example, in German patent DE 3840054.

BACKGROUND OF THE INVENTION

For improved television transmission systems, it has been shown to be desirable, particularly in view of the preference of the general public, to increase the aspect ratio of a television receiver from 4:3, as found in present standard receivers, to 16:9 (i.e., the recommended aspect ratio of future HDTV standards) or 5:3 without losing compatibility with existing television standards (PAL, NTSC, SECAM). To achieve this, it is suggested in German patent DE 3840054 to separate, at the transmitter, every fourth line of the picture signal, and to spatially compress or interpolate the remaining lines in the correct spatial position. The separated lines are added, directly or in scrambled form, into vacated spatial areas created by the spatial compression along upper and lower edges of the picture. The resulting picture signal is then transmitted in coded form. The original picture signal with a 16:9 or 5:3 aspect ratio is reconstructed from a received decoded picture signal. Specifically, the separated lines (i.e., every fourth line) disposed in the upper and lower picture edge areas are, after descrambling, inserted among the remaining spatially decompressed (expanded) lines in the correct line sequence. Upon reproducing the received signal by a current (state-of-the-art) 4:3 aspect ratio television receiver, the scrambled lines added along the upper and lower picture edge areas are reproduced as quasi-noise bands (bars) which can be disturbing to a viewer.

It is an object of the invention to develop a system of the aforementioned type such that, upon reproduction of the picture signal by a conventional 4:3 television receiver, the upper and lower edge areas of the picture appear as essentially consistent picture areas.

SUMMARY OF THE INVENTION

A compatible wide aspect ratio television signal in accordance with the principles of the present invention is representative of an image containing vacated spatial areas along upper and lower edges of an image defined by lines remaining after lines are separated from groups of successive lines within an image scanning interval. The separated lines are inserted into the vacated spatial areas. A first carrier is modulated with non-active portions of the separated lines, and with the remaining lines. A second carrier is modulated with time expanded active image portions of the separated lines, and is disposed in an upper portion of the television signal frequency spectrum so as to be suppressed in a standard aspect ratio receiver.

Figure 1:
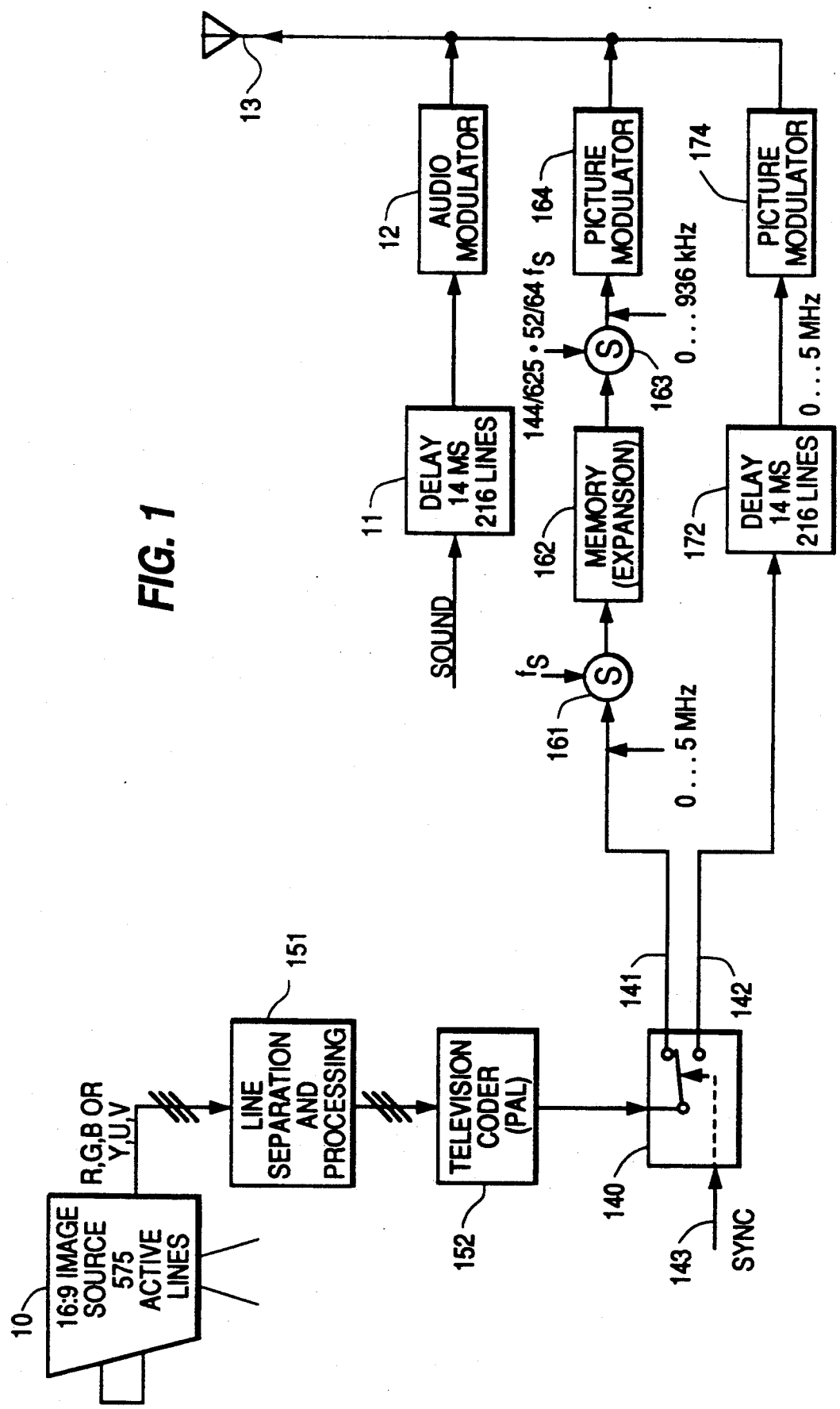
FIG. 1 shows a block diagram of television signal transmitter apparatus including a system according to the invention.

In the transmitter arrangement of FIG. 1, a television picture source 10 (e.g., a camera) scans using an enlarged picture aspect ratio of 16:9 (or 5:3). In this example, the picture signals from source 10 correspond to conventional picture signals except for the altered aspect ratio. In accordance with the PAL standard, every television picture comprises 575 active lines.

The output signal from source 10, either an RGB or a YUV signal (indicated by the 3-way line), is applied to a picture signal processing stage 151 which separates one line from every group of four (or five) successive lines of the picture signal and spatially compresses or interpolates the remaining lines in the correct spatial position. The separated lines are inserted into vacated spatial areas along the upper and lower edges of the picture by means of unit 151. The details of this picture signal processing performed by unit 151 are described in German patent DE 3840054. The output signal from processing stage 151 is coded according to the desired television standard, for example the PAL standard, in a coder 152. Instead of standard PAL coding, coding may also be advantageously performed according to the so-called I-PAL technique (as described in German patent DE-PS 3338192) in order to avoid crosstalk effects between luminance and color signal components.

Figure 3:
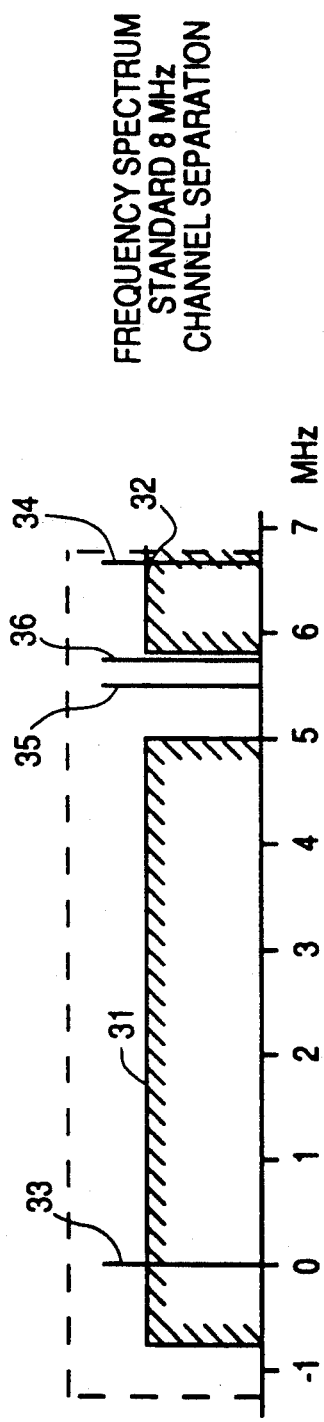
FIG. 3 shows a conventional 8 MHz television channel occupied by two picture signal bands and audio carriers located therebetween in accordance with the television system of FIGS. 1 and 2.

The active parts of the separated lines, inserted along the upper and lower picture edges, are temporally expanded up to the duration of an image frame, thereby reducing their bandwidth. The signal resulting from this operation is, as shown in FIG. 3, transmitted within the usual 8 MHz television channel in the unoccupied gap between second audio carrier 36 and the upper end of the 8 MHz channel (FIG. 3, second partial band 32). The non-active blanking regions of the separated lines and all the remaining lines are transmitted together in normal carrier position with unaltered bandwidth below first audio carrier 35 within the 8 MHz television channel (FIG. 3, first partial band 31). In a standard 4:3 television receiver, first partial band 31 lies within the IF transmittance curve while second partial band 32 lies outside the IF transmittance curve and is therefore suppressed by a standard 4:3 television receiver. When first partial band 31 is reproduced in a standard 4:3 television receiver, the non-active parts of the separated lines along the upper and lower picture edges only serve for synchronization, whereby the missing active line regions along the upper and lower picture edges are reproduced as bars of a constant single color, for example, black or gray.

The output signal of coder 152 is applied to a signal splitter 140 with a control input 143 for receiving clock pulses from a studio synchronizing signal SYNC (which also controls picture source 10). The switching action of signal splitter 140 between two outputs 141 and 142 occurs such that the active parts of the separated lines, inserted along the upper and lower picture edges, are transmitted to first output 141. As discussed in German patent DE 3840054, there are 2×72 separated lines per frame, or 4×36 lines per two fields. The non-active portions (e.g., the blanking portions) of the 2×72 separated lines and all the remaining lines are applied together to second output 142 of signal splitter 140. This signal segment is delayed by a first delay stage 172 exhibiting a delay time t, as will be discussed. Afterwards, this signal is modulated onto a first picture carrier 33, corresponding to the standard picture carrier, in a first picture modulator 174. The upper side band of the modulated signal has a bandwidth of 5 MHz, while the lower sideband exhibits a standard 0.75 MHz bandwidth (FIG. 3, first partial band 31).

The signal at first output 141 of signal splitter 140 is scanned in a first scanning stage 161 with a first scanning frequency fs, and written into an intermediate memory 162. With PAL signals, scanning frequency fs is normally four times the value of the color subcarrier frequency. Intermediate memory 162 is read out using a second scanning frequency less than the first scanning frequency associated with unit 161 by the ratio: (SL) (D1)÷(TL) (D), where SL is the number of separated lines, D1 is the duration of the active line, TL is the total number of lines, and D is the line duration. In this example, the second scanning frequency generated by scanning stage 163 for reading out from intermediate memory 162 is: (144/625)×(52/64)×fs.

The expansion factor in this case is 5.34, corresponding to the ratio between the first scanning frequency and the second scanning frequency. Correspondingly, the expanded signal at the output of stage 163 has a reduced bandwidth of 5 MHz/5.34=936 kHz. The expanded signal is modulated onto a second picture carrier 34 (FIG. 3) having a frequency separation of approximately 6.7 MHz from first picture carrier 33, by means of a second picture modulator 164. The modulated signal generated in this way lies within the 8 MHz television channel as shown in FIG. 3, with its lower sideband above second audio carrier 36 and with its vestigial sideband adjoining the channel boundary (FIG. 3, second partial band 32). As already mentioned, second partial band 32 lies outside the IF transmittance curve of standard 4:3 television receivers, which pass only first partial band 31.

The television sound signal is also delayed by delay time t in a second delay stage 11, and is modulated with its stereo portions onto two audio carriers 35 and 36 (FIG. 3) in an audio modulator 12. The audio modulation carrier frequencies are the picture carrier frequency plus 5.5 MHz, and the picture carrier frequency plus 5.75 MHz. All modulation signals are combined to form the broadcast signal before being transmitted by an antenna 13 in FIG. 1.

Figure 2:
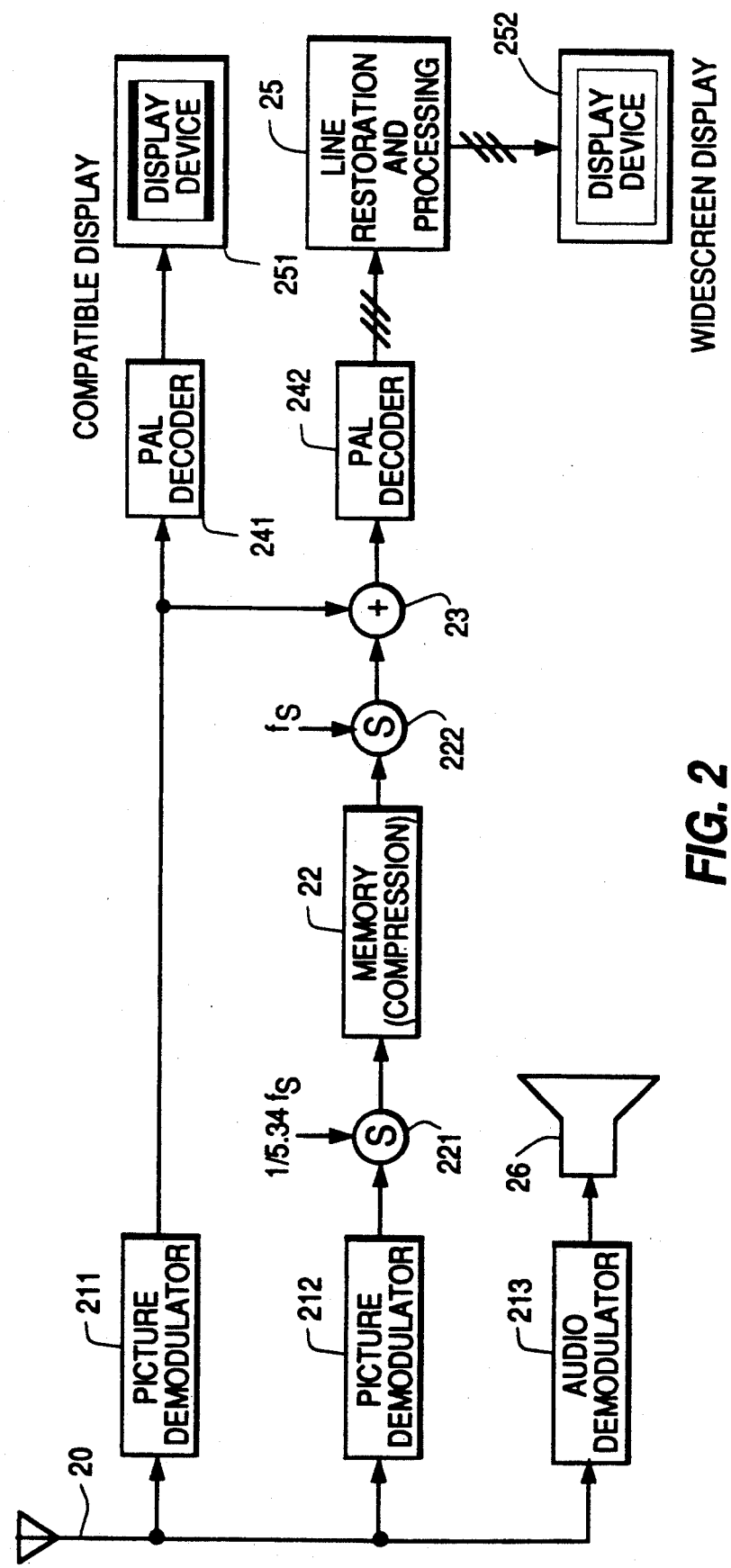
FIG. 2 shows a block diagram of a television signal receiver including a system according to the invention.

FIG. 2 shows receiver signal processing apparatus for a standard 4:3 television receiver (first picture demodulator 211, first PAL decoder 241 and first reproduction unit 251), and also for a wide screen receiver with an aspect ratio of 16:9 (or 5:3). A broadcast signal received at a receiving antenna 20 is applied to first picture demodulator 211 and to second picture demodulator 212. First demodulator 211 demodulates first picture carrier 33 with first partial band 31, and second picture demodulator 212 demodulates second picture carrier 34 with second partial band 32. The signal at the output of second demodulator 212 is compressed by the amount of the signal expansion performed at the transmitter. This is accomplished by using a first scanning stage 221 for writing into an intermediate memory 22, and a second scanning stage 222 for reading out from intermediate memory 22. The scanning frequency of second scanning stage 222 is larger than the scanning frequency of first scanning stage 221 by the ratio: (TL) (D)÷(SL) (D1), where TL is the total number of lines, D is the line duration, SL is the number of separated lines, and D1 is the duration of the active line.

The scanning frequency of stage 222 preferably corresponds to the scanning frequency of first scanning stage 161 at the transmitter, i.e., it corresponds to the value fs. The modulated signal at the output of second picture demodulator 212 is compressed by the factor 5.34, and corresponds to the signal produced at first output 141 of signal splitter 140 at the transmitter. Correspondingly, the bandwidth of the compressed signal is again 936 kHz×5.34=5 MHz. An adder 23 adds this signal to the demodulation signal (first partial band 31) from the output of first picture demodulator 211 in the correct temporal position, so that a resulting combined signal applied to a second PAL decoder 242 corresponds to the output signal of PAL coder 152 at the transmitter. A picture signal processing stage 25 receives the output signal from second PAL decoder 242 and reverses the rearrangement of the lines (1 out of 4 or 1 out of 5 respectively) produced by picture signal processing stage 151 at the transmitter. Image reproduction unit 252 displays a television picture with a 16:9 (or 5:3) picture aspect ratio in response to the picture signal from unit 25. It is noted that the standard 8 MHz channel is sufficient for conveying this picture information not only in the studio but also in the transmission path.

Television sound information is obtained using an audio demodulator 213, and is applied to one or more loudspeakers 26 in the 16:9 wide screen receiver or in the standard 4:3 receiver. As already explained, the standard television receiver reproduces the output signal from picture demodulator 211 with bars along the upper and lower picture edges with uniform color, for example, black or gray. Such uniform color bars offer relatively little disturbance to a viewer, and correspond to the known reproduction of wide screen films on television.

Figure 4:
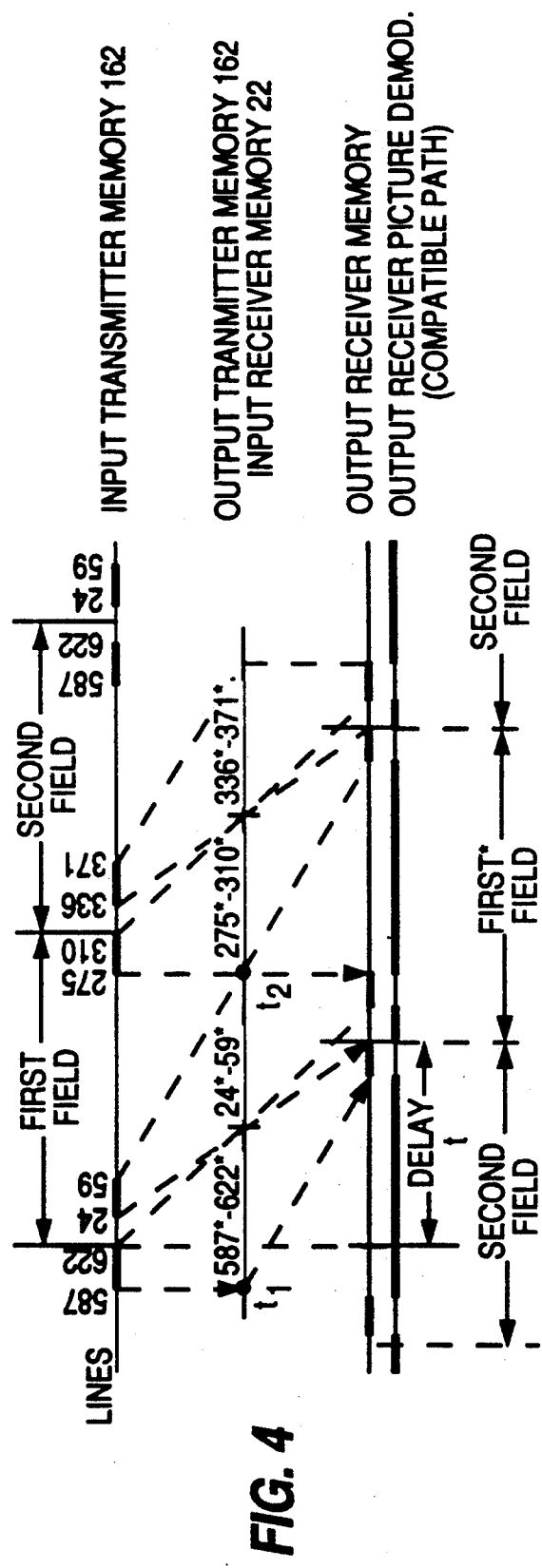
FIG. 4 depicts expansion at the transmitter and compression at the receiver of the active regions of separated television lines which are transmitted in the right-hand picture signal partial band of FIG. 3.

The expansion and compression performed by the apparatus of FIGS. 1 and 2 is further illustrated in FIG. 4. The temporal position of the separated 4×36 lines for two successive television fields is illustrated, whereby groups of each set of 36 lines are reproduced with line numbers at the start and finish of the line group as follows: lines 587 through 622, lines 24 through 59, lines 275 through 310, and lines 336 through 371.

The top portion of FIG. 4 shows the temporal position of the line groups at first output 141 of signal splitter 140 at the transmitter. The middle portion of FIG. 4 shows the temporal position of the expanded line groups at the output of second scanning stage 163 at the transmitter, or rather, at the input of first scanning stage 221 at the receiver. The bottom portion of FIG. 4 illustrates the temporal position of the line groups at the output of second scanning stage 222 at the receiver, or respectively, the remaining signal, temporally adapted thereto by means of delay t (first delay stage 172), at the output of first picture demodulator 211. As seen by comparing the top and middle portions of FIG. 4, the group of lines 587 through 622 is temporally stretched by 5.34 times, whereby the following, stretched group of lines 24 through 59 joins directly at the end of the stretched group without a gap. Gap-less joining of stretched line groups 275 through 310 and 336 through 371 similarly results.

The line groups are returned to their original temporal length by compression at the receiver. However, a temporal offset results as indicated in FIG. 4 by time delay t. This temporal offset is due to the method of operation of intermediate memories 162 and 22. That is, intermediate memory 162 can begin "writing in" (vertical arrow from the top representation to the middle representation in FIG. 4) simultaneously with the start of the line 587 (time t1), while intermediate memory 22 at the receiver can then have finished "reading out" within one field at the earliest when the final stretched scanning value of the second group of lines 24 through 59 has been transmitted at time t2 (vertical arrow from the middle representation to the bottom representation of FIG. 4). Time delay t is therefore calculated from the difference between the total number of active lines in one field and the number of separated lines of one field, in this example: (288−72) lines=216 lines, corresponding to approximately 13.8 ms. The signal at second output 142 of signal splitter 140 (corresponding to first partial band 31 in FIG. 3) is delayed by this time delay t in first delay stage 172. The same is true for the sound signal in second delay stage 11. As a result of the delay in first delay stage 172, the signal is situated at the output of first picture demodulator 211 (bottom-most representation of FIG. 4) temporally aligned with the output signal from intermediate memory 22. Thus the data of both signals are temporally aligned and can be combined.

Time delay t illustrated and discussed above can be further explained by the fact that intermediate memory 162 at the transmitter "writes in" a discontinuous manner but "reads out" in a continuous manner, and that intermediate memory 22 at the receiver writes in a continuous manner but reads out in a discontinuous manner.

We claim:

1. A system for processing a television signal containing wide aspect ratio information compatible with a standard television signal containing image information having an aspect ratio less than that of said compatible television signal, said system comprising:
    means for providing a widescreen television signal having an image aspect ratio greater than said standard aspect ratio, said widescreen television signal (a) occupying a frequency spectrum including a first carrier modulated with first image information defining a first modulation band, and (b) containing vacated spatial areas along upper and lower edges of an image defined by lines remaining after lines are separated from groups of a prescribed number of successive lines within an image scanning interval, said separated lines being inserted into said vacated spatial areas;
    means for temporally expanding active image portions of said separated lines;
    means for modulating a second carrier with said time expanded portions of said separated lines to produce a second modulation band disposed in an upper portion of said frequency spectrum, said second modulation band subject to being suppressed in a standard television receiver for processing a standard aspect ratio television signal;
    means for modulating said first carrier with nonactive portions of said separated lines and with said remaining lines so that said first modulation band is within a passband of said standard receiver for processing by said standard receiver as said standard television signal;
    means for modulating a third carrier with audio information; and
    means for combining said modulated first, second and third carriers for transmission.

2. A system according to claim 1, wherein
    said providing means includes means for separating one line from each successive group of four lines to produce said separated lines, and means for spatially translating said remaining lines to produce said vacated spatial areas;
    said second modulation band lies substantially outside of the intermediate frequency (IF) passband of said standard receiver;
    said first modulation band lies within the intermediate frequency passband of said standard television receiver; and
    said non-active portions of said separated lines and said remaining lines modulating said first carrier exhibit a prescribed time delay.

3. A system according to claim 2, wherein said expanding means includes
    memory means having a write input and a read output;
    means for writing information representative of said active portions of said separated lines into said memory means at a first rate; and
    means for reading said information out of said memory means at a slower second rate in accordance with the factor (SL)(DI)÷(TL)(D) where SL is the number of separated lines, D1 is the duration of an active line, TL is the total number of lines, and D is the duration of a line.

4. A system according to claim 3, wherein
    said first rate is the reciprocal of four times the color subcarrier frequency.

5. A system for receiving a widescreen television signal having an image aspect ratio greater than that of a standard television signal image, said widescreen television signal containing vacated spatial areas along supper and lower edges of an image defined by lines remaining after lines are separated from groups of a prescribed number of successive lines within an image scanning interval, said separated lines being inserted into said vacated spatial areas; said system comprising:
    first means for demodulating a first carrier modulated with image information defining a first modulation band within an image frequency spectrum;
    second means for demodulating a second carrier modulated with image information defining a second modulation band within an upper portion of said image frequency spectrum, said second modulation band including information representative of said separated lines;
    means for temporally compressing said information representative of said separated lines from said second demodulating means; and
    means for combining output signals from said temporal compressing means and from said first demodulating means for providing an output image signal.

6. A system according to claim 5, wherein said compressing means includes
    memory means having a write input and a read output;
    means for writing information derived from output signals from said second demodulating means into said memory means at a first rate, and for reading information from said memory means at a faster second rate in accordance with the factor (TL)(D)÷(SL)(D1) where TL is the total number of lines, D is the duration of a line, SL is the number of separated lines, and D1 is the duration of an active lines.

7. system according to claim 6, wherein said first rate is the reciprocal of four times the color subcarrier frequency.

8. A system according to claim 5, and further including television signal decoder means responsive to said output image signal for providing a decoded signal; and processing means responsive to said decoded signal for restoring image lines to an original sequence.

* * * * *